M. & S. BLOGG.
COVERING FOR BREAD OR THE LIKE.
APPLICATION FILED AUG. 25, 1911.
1,149,713.
Patented Aug. 10, 1915.
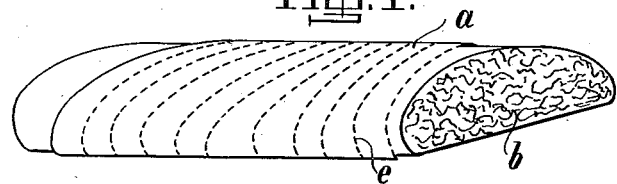
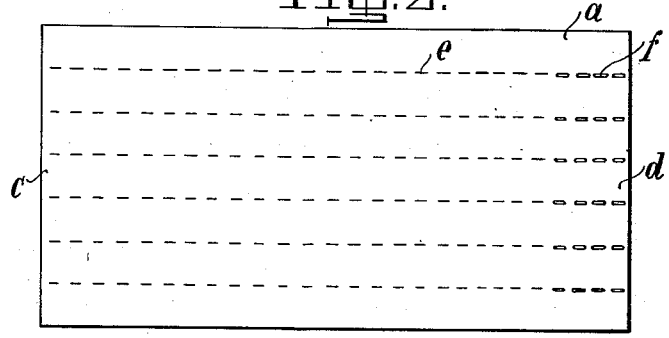
WITNESSES:
INVENTORS,

UNITED STATES PATENT OFFICE.

MAX BLOGG AND SIEGFRIED BLOGG, OF HAMBURG, GERMANY.

COVERING FOR BREAD OR THE LIKE.

1,149,713.

Specification of Letters Patent. Patented Aug. 10, 1915.

Application filed August 25, 1911. Serial No. 646,051.

*To all whom it may concern:*

Be it known that we, MAX BLOGG and SIEGFRIED BLOGG, subjects of the German Emperor, and residents of Hamburg, Germany, have invented a certain new and useful Improvement in Covering for Bread or the like, of which the following is a specification.

This invention relates to an improvement in protecting covering for bread and the like consisting therein that at one or at both ends, where it is pasted together and which cover the bottom surface of the bread, it is not perforated but provided with elongated depressions.

It is well known that the loaves of bread sold in commerce are surrounded by a covering of paper or other material which protects the bread from immediate contact with the hands of either the seller or the purchaser.

When the bread is sliced of course that protecting cover must be removed and in order that it shall not need to be taken off in its entirety and the bread may still be protected when some slices have been cut, it has become known to provide the paper covering with perforations running transverse to the bread which divide the covering into sections that can be torn off easily according to circumstances. Now in order to prevent the glue used to paste the covering together from getting in contact with the bread, thereby dirtying it and impairing its taste besides making it unwholesome depending upon the constituent of the glue, the paper forming the protecting cover is not perforated at its ends where they are glued together but provided with elongated depressions which will make the tearing thereof easier and yet because they are depressions only and do not cut through the said paper will prevent the glue and dirt or dust to get in contact with the bottom of the loaves.

In the accompanying drawings, Figure 1 shows a loaf of bread provided with the protecting covering, Fig. 2 shows the covering itself and the elongated depressions at one of the ends thereof.

The covering is thus wrapped around the bread loaf, that the end thereof provided with the depressions $f$ is located under the bottom of the loaf. The other end $c$ of the covering is then glued to this impervious end $f$. Thus it will be impossible for the glue to come in contact with the bread, and yet the tearing of strips of covering in the prolongation of the perforation line $e$ will become easy.

Instead of providing the one end $d$ only with elongated depressions, such depressions can also be made in the other end $c$ of the covering $a$.

We claim as our invention:—

1. A covering for protecting bread, comprising a sheet of paper adapted to be wrapped around the bread and formed with parallel rows of elongated slits separated by imperforate parallel strips readily separable from one another extending partially around the bread, one end of the sheet being imperforate and provided with rows of weakening impressions forming continuations of said rows of slits.

2. A covering for protecting bread, comprising a sheet of paper adapted to be wrapped around the bread and formed with parallel rows of elongated slits separated by imperforate parallel strips readily separable from one another extending partially around the bread, the ends of the sheet being imperforate and provided with rows of weakening impressions forming continuations of said rows of slits.

3. A covering for protecting bread, comprising a sheet of paper adapted to be wrapped around the bread and formed with parallel rows of elongated slits separated by imperforate parallel strips readily separable from one another extending partially around the bread, one end of the sheet being imperforate and provided with rows of weakening impressions forming continuations of said rows of slits, the ends of said sheet being glued together with the imperforate portion between glue and the bread.

In testimony whereof we have signed our names to this specification in the presence of two subscribing witnesses.

MAX BLOGG.
SIEGFRIED BLOGG.

Witnesses:
GUSTAV WELIC,
ERNEST H. L. MUMMENHOFF.